(12) United States Patent
Choi

(10) Patent No.: US 7,861,074 B2
(45) Date of Patent: Dec. 28, 2010

(54) ELECTRONIC SYSTEMS USING FLASH MEMORY MODULES AS MAIN STORAGE AND RELATED SYSTEM BOOTING METHODS

(75) Inventor: Sung-Up Choi, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 569 days.

(21) Appl. No.: 11/954,411

(22) Filed: Dec. 12, 2007

(65) Prior Publication Data

US 2008/0195854 A1  Aug. 14, 2008

(30) Foreign Application Priority Data

Feb. 13, 2007  (KR) .................. 10-2007-0015009

(51) Int. Cl.
*G06F 15/177* (2006.01)
(52) U.S. Cl. .................. 713/2; 713/1; 713/100; 365/185.11
(58) Field of Classification Search .................. 713/1, 713/2, 100; 365/185.11
See application file for complete search history.

(56) References Cited

U.S. PATENT DOCUMENTS

| | | | | |
|---|---|---|---|---|
| 6,236,593 | B1 * | 5/2001 | Hong et al. | 365/185.11 |
| 7,080,245 | B2 * | 7/2006 | Ballard et al. | 713/2 |
| 2002/0191311 | A1 | 12/2002 | Ulrich et al. | |
| 2004/0153479 | A1 | 8/2004 | Mikesell et al. | |
| 2006/0224817 | A1 * | 10/2006 | Atri | 711/103 |
| 2007/0260837 | A1 * | 11/2007 | Hsu | 711/163 |

FOREIGN PATENT DOCUMENTS

| | | |
|---|---|---|
| JP | 2004-013477 | 1/2004 |
| KR | 10-2000-0003162 A | 1/2000 |
| KR | 1020000062711 A | 10/2000 |
| KR | 10-2003-0028218 A | 4/2003 |
| KR | 10-2003-0065223 A | 8/2003 |
| KR | 10-2007-0021849 A | 2/2007 |

* cited by examiner

*Primary Examiner*—Thuan N Du
(74) *Attorney, Agent, or Firm*—Myers Bigel Sibley & Sajovec

(57) ABSTRACT

Electronic systems using flash memory modules as a main storage, and a booting methods thereof, are provided. The booting method may include reading FAT (file allocation table) information for each of the flash memory modules coupled to the electronic system when it is detected that the number of the flash memory modules coupled to the electronic system has changed, generating SFAT (super-FAT) information including FAT information for each of the flash memory modules, and writing the SFAT information to a boot flash memory module. Thus, device information in the electronic system may be automatically changed when a flash memory module used is inserted or removed.

19 Claims, 4 Drawing Sheets

ELECTRONIC SYSTEMS USING FLASH MEMORY MODULES AS MAIN STORAGE AND RELATED SYSTEM BOOTING METHODS

CROSS-REFERENCE TO RELATED APPLICATION

This U.S. non-provisional patent application claims priority under 35 U.S.C. §119 from Korean Patent Application No. 2007-15009, filed on Feb. 13, 2007, the entire content of which is hereby incorporated herein by reference as if set forth in its entirety.

FIELD OF THE INVENTION

The present invention relates to electronic systems, and more particularly, to electronic systems that use flash memory modules.

BACKGROUND

Electronic systems such as personal computers, notebook computers, etc. typically use a hard disk drive as the main storage unit for the system (i.e., the storage unit on which application programs, operating systems and other software and data is stored). Hard disks are commonly used because they are relatively cheap and/or because they may have a relatively high capacity as compared to compact disks, floppy disks and various other alternate storage devices.

The operating speed of an electronic system may be limited by a number of factors including, for example, the processing speed of the system's processor(s), cache memory size, and the total amount of memory included in the system. The performance of the main storage unit may also be a factor that limits the operation speed of an electronic system. As hard drives operate by mechanically driving a magnetic disk so as to read and write data, it may be difficult to cost-effectively provide significant increases in hard drive operating speeds.

Flash memories are a known type of semiconductor memory. In recent years, significant advancements have been made in both the integration levels of flash memory devices and the price of manufacturing such devices. As a result of these advancements, flash memory devices are now being used as the main storage unit in some electronic systems. A flash memory module refers to a module that includes one or more flash memory chips that may be inserted into a memory slot of a computer or other electronic system. To increase the capacity of the main storage, additional flash memory modules may be inserted into the memory slot. In addition, as occasion demands, some flash memory modules can be removed from the memory slot. When a flash memory module is inserted into or removed from the memory slot, device information stored, for example, in a CMOS RAM and/or file allocation table (FAT) information stored in the flash memory modules may need to be changed.

SUMMARY

Some embodiments of the present invention provide methods for automatically updating device information in an electronic system when a flash memory module used as main storage is inserted/removed, and booting methods for such systems.

Pursuant to certain embodiments of the present invention, methods of booting an electronic system are provided in which a power-on self-test is performed. A determination is made that the number of flash memory modules that are coupled to the electronic system has changed. FAT (file allocation table) information is read for each of the flash memory modules that are coupled to the electronic system in response to determining that the number of flash memory modules that are coupled to the electronic system has chanced. SFAT (super-FAT) information that includes FAT information for each of the flash memory modules is generated. This SFAT information is then written to a boot flash memory module. In some embodiments, the boot flash memory module may include a boot file.

In some embodiments, determining that the number of flash memory modules that are coupled to the electronic system has changed comprises determining that the number of flash memory modules coupled to the electronic system differs from information stored in a CMOS RAM regarding the number of flash memory modules coupled to the electronic system.

In some embodiments, each of the flash memory modules includes a first region where the FAT information is stored, a second region where mapping information for converting a logical address input from the electronic system into a physical address is stored, and a third region where user data is stored. The SFAT information may be stored in the first region of the boot flash memory module.

In further embodiments of the present invention, the methods may further include generating new mapping information of each of all the flash memory modules and writing the new mapping information to the second region of each of the flash memory modules.

Pursuant to further embodiments of the present invention, electronic systems are provided that include a memory slot, at least one flash memory module in the memory slot, a BIOS ROM that stores a BIOS code, and a processor. The processor may be configured to execute the BIOS code to perform a power-on self-test (POST), to generate super file allocation table (SFAT) information including file allocation table (FAT) information for each of the flash memory modules in the memory slot when the number of flash memory modules in the memory slot has changed, and to write the SFAT information to a boot flash memory module of the flash memory modules.

In some embodiments, the electronic system may further include a CMOS RAM that stores device information, and the processor may determine that the number of flash memory modules in the memory slot has changed when the device information stored in the CMOS RAM is not equal to a detected number of flash memory modules in the memory slot.

BRIEF DESCRIPTION OF THE FIGURES

The accompanying figures are included to provide a further understanding of the present invention, and are incorporated in and constitute a part of this specification. The drawings illustrate embodiments of the present invention and, together with the description, serve to explain principles of the present invention. In the figures.

DETAILED DESCRIPTION

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this disclosure and the relevant art and will not be interpreted in an idealized or overly formal sense unless expressly so defined herein.

Figure 1:
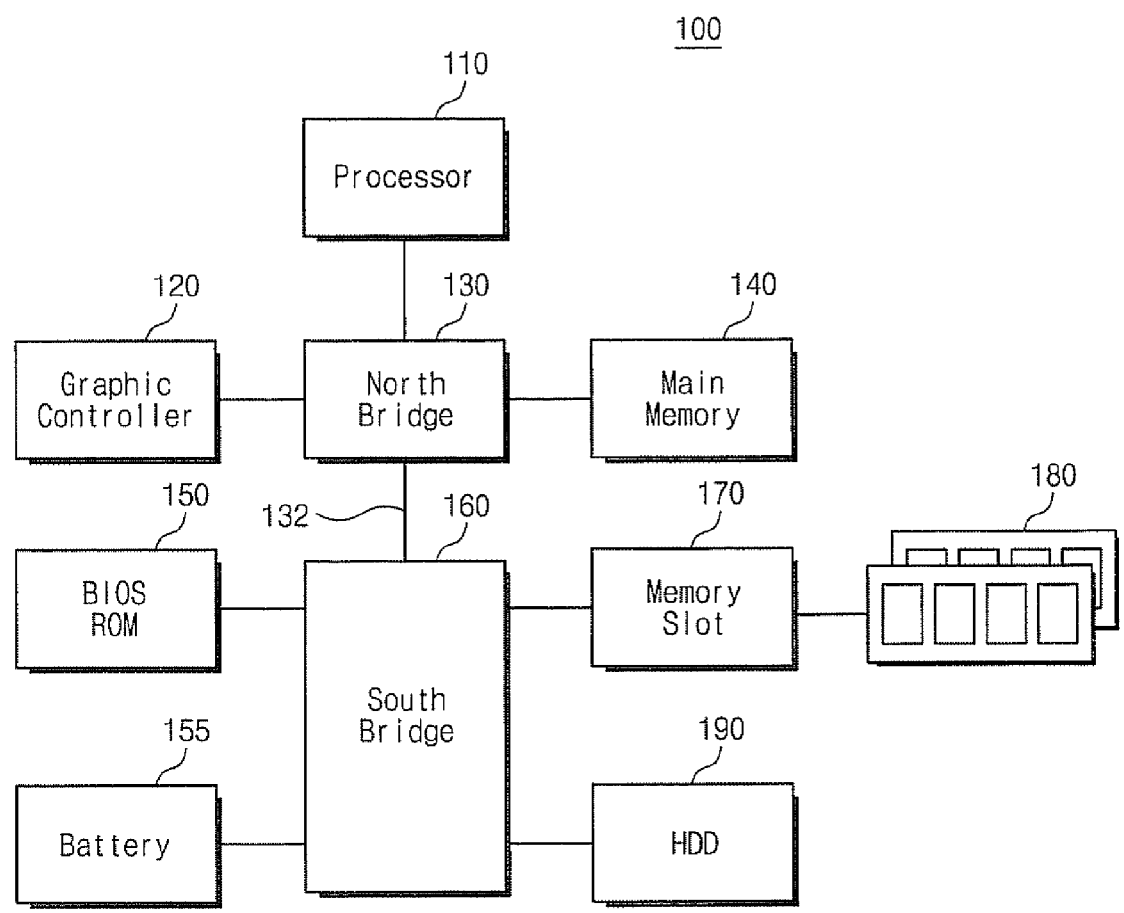
FIG. 1 is a block diagram illustrating components of a computer system according to certain embodiments of the present invention.

FIG. 1 is a block diagram of a computer system 100 according to certain embodiments of the present invention. The computer system 100 includes a processor 110 which may act as a central processing unit, a graphic controller 120, a north bridge 130, a main memory 140, a BIOS ROM (Basic Input/Output System Read Only Memory) 150, a battery 155, a south bridge 160, a memory slot 170, one or more flash memory modules 180, and a hard disk drive 190. It will be appreciated that the computer system 100 may include other devices such as, for example, cache memories, modems, parallel or serial interfaces, SCSI interfaces, network interface cards, a variety of buses and/or subsystems, and/or input/output devices such as a keyboard, a mouse, and a printer. It will also be appreciated that not all of the components of the computer system 100 need be implemented separately. For example, the north bridge 130 and the south bridge 160 may be implemented on a single chip (or on separate chips).

As shown in FIG. 1, the processor 110 may be coupled to the north bridge 130. The north bridge 130 may provide an interface between the processor 110, the graphic controller 120, the main memory 140, and a PCI bus 132. The south bridge 160 may provide an interface between the PCI bus 132 and interfaces connected to various peripherals, devices, and subsystems.

The north bridge 130 provides communication access between the processor 110, the graphic controller 120, the main memory 140, devices coupled to the PCI bus 132, and devices and subsystems coupled to the south bridge 160. The main memory 140 may comprise a random access memory (RAM).

The south bridge 160 is coupled to the PCI bus 132, and provides an interface between the PCI bus 132 and various devices and subsystems such as a modem, a printer, a mouse, and the like, through another bus (not shown) such as, for example, an X-bus or an ISA bus. The south bridge 160 is coupled to the flash memory module 180 through the memory slot 170. The south bridge 160 may be coupled to the hard disk drive 190 or CD or DVD drives, high capacity storage devices, zip drives, and CDRW drives, and receives power from a battery 155.

The memory slot 170 is constructed such that a plurality of the flash memory modules 180 can be inserted therein. It will be understood that the memory slot 170 may comprise a single slot or a plurality of slots that are collectively referred to as memory slot 170. The number of the flash memory modules 180 inserted into the memory slot 170 may be changed up to a maximum number that the memory slot 170 allows.

In the computer system 100 using the flash memory module 180 as the main storage unit, a boot file and an operating system may be stored in the flash memory module 180.

Flash memories are now widely used in mobile and embedded system applications because flash memories have several advantages over other memory options including fast access speed, low power consumption and nonvolatility, which refers to the fact that a flash memory retains stored data even if the power supply to the flash memory is interrupted. However, unlike a hard disk, a sector of a flash memory cannot be overwritten if the sector already contains data. As such, with flash memories, the entire memory block that contains the sector to which data is to be written is erased before new data is written to the sector. In order to perform such an erasing operation, concepts of a logic block and a physical block have been introduced into the flash memory. In particular, methods of mapping logic blocks and physical blocks have been developed, and the maintenance and management of a mapping table are important for securing the performance of the flash memory and in ensuring data integrity for a previous operation when power is supplied again after the power supply has been interrupted.

Since the flash memory is mainly used as a high capacity storage, it is important to perfectly restore data for an operation performed before power-off when power is again supplied to the device. Accordingly, information relating to the operation such as logical and physical addresses of corresponding data, the type of operation, error correction code (ECC) information, block abrasion, and/or an effective mark securing data integrity may be maintained when the operation is performed. Such state information is referred to as meta-data, and the above-described mapping table likewise comprises meta-data. The meta-data is an index indicating an operation state of a current flash memory. As such, the frequency at which the meta-data is accessed may be very high.

The method by which the meta-data is managed may vary depending on the type of electronic system in which the flash memory is being used. In general, since the meta-data should be maintained even after power is turned off, a predetermined region of the flash memory is allocated, and meta-data is written to this predetermined region whenever operations are performed.

The flash memory module 180 includes the meta-data as described above. The meta-data of each flash memory module 180 should be changed when a new flash memory module 180 is inserted into the memory slot 170.

Figure 2:
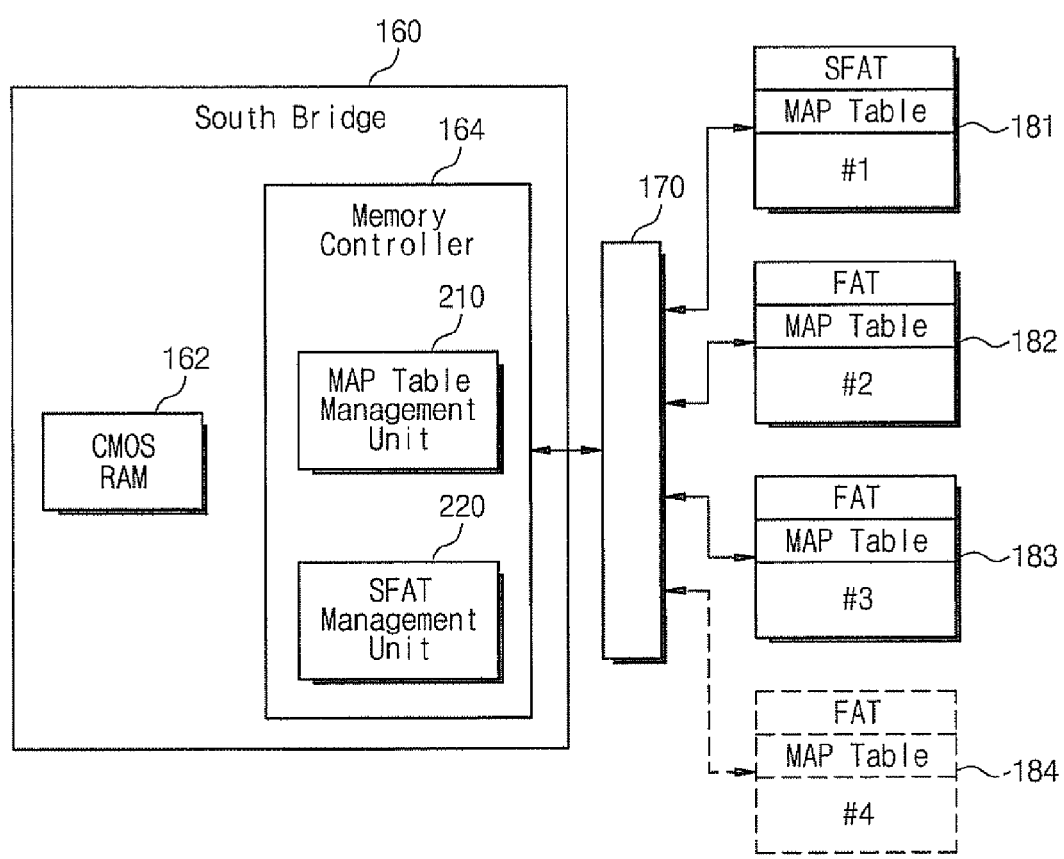
FIG. 2 is a block diagram illustrating an implementation of the south bridge of FIG. 1 according to certain embodiments of the present invention.

FIG. 2 is a block diagram illustrating an implementation of the south bridge 160 of FIG. 1 according to certain embodiments of the present invention.

As shown in FIG. 2, the south bridge 160 may include a CMOS RAM (random access memory) 162 and a memory controller 164. The CMOS RAM 162 may include system constitution data. The system constitution data contains information regarding the devices that are part of the computer system 100, and operational environment information of the computer system 100 such as the current date and time, whether a floppy disk drive is connected, boot drive information, hard disk information, power management information, etc. The CMOS RAM 162 may also store information regarding the number of flash memory modules coupled to the south bridge 160. The CMOS RAM 162 is able to maintain this stored data by virtue of power supplied from the battery 155 coupled to the south bridge 160. The user can change setup information stored in the CMOS RAM 162 through, for example, a BIOS set-up menu.

The memory controller 164 controls access to the flash memory modules 180. In the example of FIG. 2, it is assumed that up to four flash memory modules 180 may be inserted into the memory slot 170, which are individually designated as flash memory modules 181-184. The memory controller 164 may include a map table management unit 210 and an SFAT management unit 220.

The flash memory modules 181-184 are coupled to the memory slot 170. Although FIG. 2 illustrates that three memory modules 181-183 are coupled to the memory slot 170 and that one additional flash memory module 184 could be inserted, it will be appreciated that in other embodiments the memory slot 170 may hold more (or fewer) than four flash memory modules and that the actual number of flash memory modules used may vary up to the maximum number that the memory slot 170 allows.

Each of the flash memory modules 181-184 may include a region where file allocation table (FAT) information is stored, a region where a map table is stored, and a user data region where user data is stored. The map table may include mapping information for converting a logic block address that is input from the processor 110 into a physical block address, as well as the aforementioned meta-data. One of the flash memory modules (here module 181), referred to herein as the boot flash memory module 181, contains boot files that store super-FAT (SFAT) information. SFAT information refers to FAT information for each of the other flash memory modules 182-184 as well as FAT information of the flash memory module 181.

The map table management unit 210 in the memory controller 164 manages the map tables of the flash memory modules. The SFAT management unit 220 manages SFAT information in the boot flash memory module 181. The SFAT information includes SFAT information for each of the flash memory modules 181-184 that are coupled to the computer system 100. When one of the flash memory modules 181-183 coupled to the memory slot 170 is removed, or when a new flash memory module 184 is inserted into the memory slot 170, the SFAT information in the boot flash memory module 181 should be updated. Likewise, when one of the flash memory modules 181-183 coupled to the memory slot 170 is removed or a new flash memory module 184 is inserted into the memory slot 170, the map table of each of the memory modules should be updated.

The BIOS ROM 150 of FIG. 1 stores a basic input/output system (BIOS) code. The BIOS code is embedded software that controls and tests the computer system 100 such as, for example, a power-on self-test of the computer system 100.

In the computer system 100 according to embodiments of the present invention, the BIOS code compares system constitution information stored in the CMOS RAM 162, i.e., the number of the flash memory modules coupled to the memory slot 170, with the number of flash memory modules that are detected to be coupled to the memory slot 170. When the two numbers are not equal to each other, the detected number of flash memory modules is written to the CMOS RAM 162, and a control operation is performed for updating SFAT information. That is, when a flash memory module is removed from the memory slot 170 or a new flash memory module is inserted into the memory slot 170, the computer system 100 automatically detects the addition or removal of the flash memory module and performs new setup. Therefore, the computer system 100 can be normally booted and operated.

Figure 3:
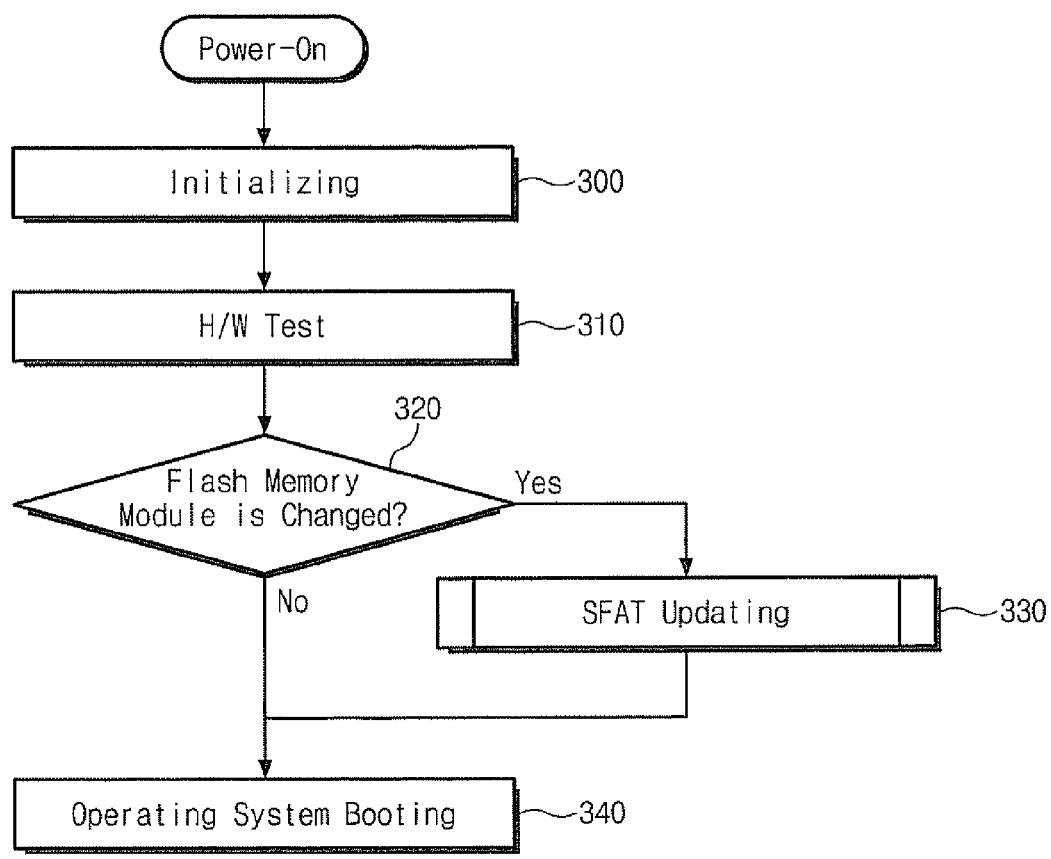
FIG. 3 is a flowchart illustrating methods according to certain embodiments of the present invention of booting a computer system after a flash memory module has been removed or a new flash memory module has been coupled to a memory slot.

FIG. 3 is a flowchart illustrating a method of booting a computer system such as the computer system 100 when one of flash memory modules 181-183 of FIG. 2 is removed or a new flash memory module 184 is inserted into the memory slot 170.

Referring to FIG. 3, in response to power being supplied to the computer system 100, the computer system is initialized (operation 300). The BIOS code command stored in the BIOS ROM 150 is then processed by the processor 110 to perform a power-on self-test (POST) hardware (H/W) test (operation 310).

In operation 320, the BIOS code determines whether the number of flash memory modules indicated by the flash memory module information stored in the CMOS RAM 162 is identical to the detected number of flash memory modules. When the two pieces of information are not identical to each other, it is determined that a new flash memory module 184 has been inserted or that one of the flash memory modules 181-183 has been removed. In this case, SFAT updating is performed in operation 330. If instead the two pieces of information are identical to each other, it is determined that the number of the flash memory modules has not changed, and thus the control operation proceeds to operation 340.

In operation 340, the BIOS code identifies a boot position (i.e., the location of the code that boots the computer system) and a boot block corresponding thereto. Although the boot position may be a floppy drive, a hard drive, CD-ROM, or a remote position, the boot position of the present embodiment is the boot flash memory module 181. The BIOS code drives the operational system by calling the boot block of the boot flash memory module 181 in order to boot the computer system 100.

Figure 4:
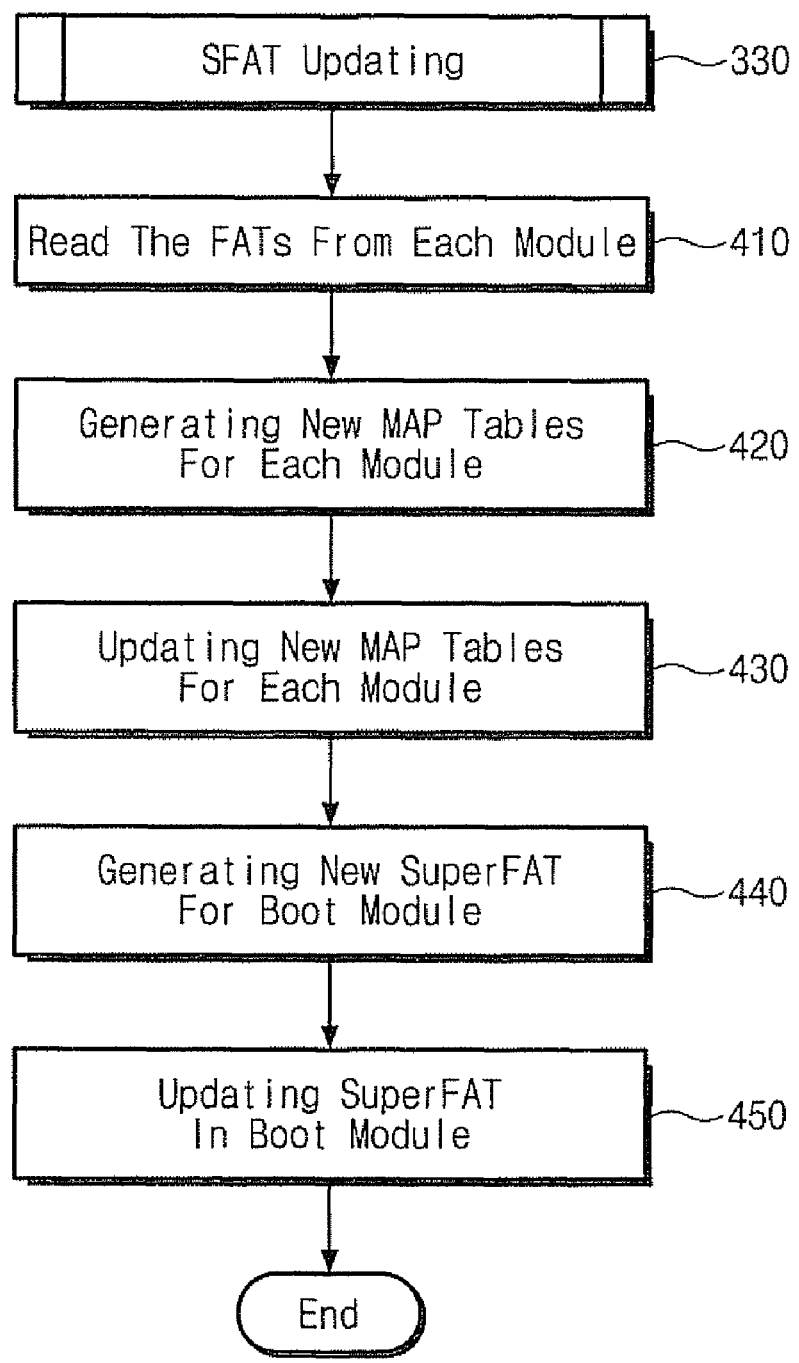
FIG. 4 is a flowchart illustrating a super file allocation table (SFAT) updating operation of the method of FIG. 3 according to certain embodiments of the present invention.

FIG. 4 is a flowchart illustrating the SFAT updating operation 330 of FIG. 3. In the method of FIG. 4, it is assumed that all the flash memory modules 181-184 coupled to the memory slot 170 use the same FAT. In addition, the boot flash memory module 181 stores SFAT that comprises the FAT for each of the other flash memory modules 182-184 as well as its own FAT. In the example of FIG. 4, it is assumed that the flash memory module information stored in the CMOS RAM 162 indicates that the three memory modules 181-183 are coupled to the memory slot 170, whereas in fact a fourth flash memory module 184 has also been coupled to the memory slot 170.

Referring to FIG. 4, in operation 410, the BIOS code controls the south bridge 160 to generate new SFAT information. The SFAT management unit 220 reads FAT information from each of the flash memory modules 181-184 coupled to the memory slot 170. In operation 420, the map table management unit 210 generates a map table suitable for each of the flash memory modules 181-184. In operation 430, the map table management unit 210 stores the newly generated map table in each of the flash memory modules 181-184. In operation 440, the SFAT management unit 220 generates SFAT information from FAT information for each of the flash memory modules 181-184. In operation 450, the SFAT management unit 220 writes the newly generated SFAT information into the boot flash memory module 181. Finally, the BIOS code stores the new number of flash memory modules in the CMOS RAM 162. In light of the SFAT and map table updating, the computer system 100 may be booted normally, and stable operation may be secured.

According to embodiments of the present invention, device information in an electronic system may be automatically changed when a flash memory module used as a main storage unit is inserted or removed from the computer 100 or other electronic system. Accordingly, the computer system is normally booted, and stable operation may be secured.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of booting an electronic system, the method comprising:
    performing a power-on self-test;
    determining that a number of flash memory modules that are coupled to the electronic system has changed;
    reading file allocation table information for each of the flash memory modules coupled to the electronic system in response to determining that the number of flash memory modules that are coupled to the electronic system has changed;
    generating information for a super file allocation table that includes file allocation table information for each of the flash memory modules; and
    writing the information for the super file allocation table to one of the flash memory modules that comprises a boot flash memory module.

2. The method of claim 1, wherein the boot flash memory module includes a boot file.

3. The method of claim 1, wherein determining that the number of flash memory modules that are coupled to the electronic system has changed comprises determining that the number of flash memory modules coupled to the electronic system differs from information stored in a CMOS RAM regarding the number of flash memory modules coupled to the electronic system.

4. The method of claim 1, wherein each of the flash memory modules includes a first region where the file allocation table information is stored, a second region where mapping information for converting a logical address input from the electronic system into a physical address is stored, and a third region where user data is stored.

5. The method of claim 3, wherein reading the file allocation table information comprises reading the file allocation table information stored in the first region of each of the flash memory modules.

6. The method of claim 4, wherein writing the super file allocation table information comprises writing the super file allocation table information to the first region of the boot flash memory module.

7. The method of claim 4, further comprising:
    generating new mapping information for each of the flash memory modules; and
    writing the new mapping information to the second region of each respective flash memory module.

8. The method of claim 1, wherein the electronic system comprises a computer system that uses the flash memory modules as a main storage unit.

9. An electronic system comprising:
    a memory slot;
    at least one flash memory module in the memory slot;
    a BIOS ROM storing a BIOS code; and
    a processor that is configured to execute the BIOS code to perform a power-on self-test, to generate super file allocation table information including file allocation table information for each of the flash memory modules in the memory slot in response to determining that the number of flash memory modules in the memory slot has changed, and to write the super file allocation table information to a one of the flash memory modules that comprises a boot flash memory module.

10. The electronic system of claim 9, further comprising a CMOS RAM that stores device information,
    wherein the processor determines that the number of flash memory modules in the memory slot has changed when the device information stored in the CMOS RAM is not equal to a detected number of flash memory module in the memory slot.

11. The electronic system of claim 10, wherein the BIOS ROM further comprises a boot file search program,
    wherein the processor is further configured to search the flash memory modules according to the boot file search program to locate a boot file in the boot flash memory module, and to write the super file allocation table information to the boot flash memory module.

12. The electronic system of claim 11, wherein each of the flash memory modules comprises:
    a first region where the file allocation table information is stored;
    a second region where mapping information for converting a logical address input from the electronic system into a physical address is stored; and
    a third region where user data is stored.

13. The electronic system of claim 9, wherein the electronic system comprises a computer system.

14. A method of booting a computer system that has one or more flash memory modules coupled thereto, the method comprising:
   detecting a number of flash memory modules that are coupled to the computer system;
   comparing the detected number of flash memory modules to stored information regarding a number of flash memory modules that were previously coupled to the computer system; and
   updating a super file allocation table that is stored in a one of the flash memory modules that comprises a boot module to include file allocation table information for each detected flash memory module if the detected number of flash memory modules is different than the number of flash memory modules that were previously coupled to the computer system.

15. The method of claim 14, wherein updating the super file allocation table comprises generating a new super file allocation table that includes file allocation table information for each of the flash memory modules.

16. The method of claim 14, wherein updating the super file allocation table comprises updating a pre-existing super file allocation table by adding to it file allocation table information for a newly added flash memory module or by removing from it file allocation table information for a removed flash memory module.

17. The method of claim 14, wherein the stored information regarding a number of flash memory modules that were previously coupled to the computer system comprises information stored in a CMOS RAM.

18. The method of claim 14, wherein each of the flash memory modules includes a first region where the file allocation table information is stored, a second region where mapping information for converting a logical address input from the computer system into a physical address is stored, and a third region where user data is stored.

19. The method of claim 18, further comprising:
   generating new mapping information for each of the flash memory modules; and
   writing the new mapping information to the second region of each respective flash memory module.

* * * * *